United States Patent
Lo

(10) Patent No.: US 9,267,390 B2
(45) Date of Patent: Feb. 23, 2016

(54) BI-METALLIC ACTUATOR FOR SELECTIVELY CONTROLLING AIR FLOW BETWEEN PLENA IN A GAS TURBINE ENGINE

(75) Inventor: Charles Lo, Peoria, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 924 days.

(21) Appl. No.: 13/427,771

(22) Filed: Mar. 22, 2012

(65) Prior Publication Data
US 2013/0247587 A1    Sep. 26, 2013

(51) Int. Cl.
*F01D 17/10*    (2006.01)
*F02C 6/08*    (2006.01)

(52) U.S. Cl.
CPC ............... *F01D 17/105* (2013.01); *F02C 6/08* (2013.01)

(58) Field of Classification Search
CPC ............. F02C 7/12; F02C 7/18; F02C 6/08; F02C 9/18; F02C 3/13; F02C 7/185; F01D 17/105; F01D 5/08; F01D 11/24; F28D 2021/0021; F05D 2260/20; Y02T 50/56; Y02T 50/675; F02K 3/075; F04D 7/0215; G05D 23/08; G05D 23/09; G05D 23/1854; G05D 23/2754
USPC ....... 251/368, 11; 137/79; 236/101 A, 101 R, 236/102
See application file for complete search history.

(56) References Cited

U.S. PATENT DOCUMENTS

| | | | |
|---|---|---|---|
| 3,300,135 A | 1/1967 | Slater | |
| 3,404,837 A | 10/1968 | James | |
| 3,477,230 A | 11/1969 | Bauger et al. | |
| 3,528,250 A | 9/1970 | Johnson | |
| 3,754,706 A | 8/1973 | Tao | |
| 3,842,597 A | 10/1974 | Ehrich | |
| 3,964,257 A * | 6/1976 | Lardellier | .................... 60/226.1 |
| 4,187,675 A | 2/1980 | Wakeman | |
| 4,245,778 A | 1/1981 | Diermayer | |

(Continued)

FOREIGN PATENT DOCUMENTS

| | | |
|---|---|---|
| GB | 1509351 | 5/1978 |
| WO | 9703281 A1 | 1/1997 |

(Continued)

OTHER PUBLICATIONS

USPTO Final Office Action, Notification Date Nov. 21, 2014; U.S. Appl. No. 13/316,960.

(Continued)

*Primary Examiner* — Phutthiwat Wongwian
*Assistant Examiner* — Stefan Ibroni
(74) *Attorney, Agent, or Firm* — Ingrassia Fisher & Lorenz, P.C.

(57) ABSTRACT

A system for selectively supplying air between separate plena of a gas turbine engine includes a gas turbine engine, a door, and a bi-metallic door actuator. The gas turbine engine comprises at least a first plenum and a second plenum, and has an opening between the first plenum and the second plenum. The is door mounted in the gas turbine engine and is movable between a closed position, in which air is prevented from flowing through the opening, and an open position, in which air may flow though the opening. The bi-metallic door actuator is coupled to the door and is configured to selectively move the door between the closed position and the open position.

14 Claims, 9 Drawing Sheets

(56) References Cited

U.S. PATENT DOCUMENTS

| | | |
|---|---|---|
| 4,254,618 A | 3/1981 | Elovic |
| 4,318,509 A | 3/1982 | Patrick et al. |
| 4,441,653 A | 4/1984 | Grudich |
| 5,012,646 A | 5/1991 | Speer |
| 5,072,781 A | 12/1991 | Goodman |
| 5,114,103 A | 5/1992 | Coffinberry |
| 5,123,242 A | 6/1992 | Miller |
| 5,137,230 A | 8/1992 | Coffinberry |
| 5,143,329 A | 9/1992 | Coffinberry |
| 5,150,569 A | 9/1992 | Chapman |
| 5,152,144 A | 10/1992 | Andrie |
| 5,161,369 A | 11/1992 | Williams |
| 5,167,117 A | 12/1992 | Herzog et al. |
| 5,269,135 A | 12/1993 | Vermejan et al. |
| 5,392,614 A | 2/1995 | Coffinberry |
| 5,438,823 A | 8/1995 | Loxley et al. |
| 5,725,180 A | 3/1998 | Chamay et al. |
| 5,918,458 A | 7/1999 | Coffinberry et al. |
| 6,039,262 A | 3/2000 | DeAnna |
| 6,106,229 A | 8/2000 | Nikkanen et al. |
| 6,349,899 B1 | 2/2002 | Raltson |
| 7,014,144 B2 | 3/2006 | Hein et al. |
| 7,587,899 B2 * | 9/2009 | Song et al. .................. 60/771 |
| 7,624,944 B2 | 12/2009 | Parikh et al. |
| 7,854,256 B2 | 12/2010 | Pineo et al. |
| 7,861,512 B2 | 1/2011 | Olver et al. |
| 7,861,968 B2 | 1/2011 | Parikh et al. |
| 7,926,261 B2 | 4/2011 | Porte |
| 8,043,045 B2 | 10/2011 | Clark et al. |
| 8,250,852 B2 | 8/2012 | Porte et al. |
| 2002/0134542 A1 | 9/2002 | Unsworth |
| 2007/0215326 A1 | 9/2007 | Schwarz et al. |
| 2008/0095611 A1 | 4/2008 | Storage et al. |
| 2008/0230651 A1 | 9/2008 | Porte |
| 2009/0007567 A1 | 1/2009 | Porte |
| 2009/0056307 A1* | 3/2009 | Mons .................. 60/226.3 |
| 2010/0303616 A1 | 12/2010 | Chir et al. |
| 2011/0023447 A1 | 2/2011 | Veilleux |
| 2011/0036939 A1 | 2/2011 | Easter |
| 2011/0127458 A1 | 6/2011 | Kozdras et al. |

FOREIGN PATENT DOCUMENTS

| | | |
|---|---|---|
| WO | 99/15767 A1 | 4/1999 |
| WO | 2008/028792 A1 | 3/2008 |

OTHER PUBLICATIONS

USPTO Office Action, Notification Date Dec. 3, 2014; U.S. Appl. No. 13/358,161.

"Engine Fire Protection Systems", Airframe & Powerplant Mechanics Powerplant Handbook, Federal Aviation Administration, Chapter 9 (pp. 391-409).

USPTO Office Action, Notification Date Aug. 7, 2014; U.S. Appl. No. 13/316,960.

USPTO Notice of Allowance, Notification Date Feb. 9, 2015; U.S. Appl. No. 13/316,960.

USPTO Office Action for U.S. Appl. No. 13/358,161 dated Jun. 5, 2015.

USPTO Interview Summary for U.S. Appl. No. 13/358,161 dated Jul. 20, 2015.

USPTO Notice of Allowance for U.S. Appl. No. 13/358,161 dated Sep. 29, 2015.

* cited by examiner

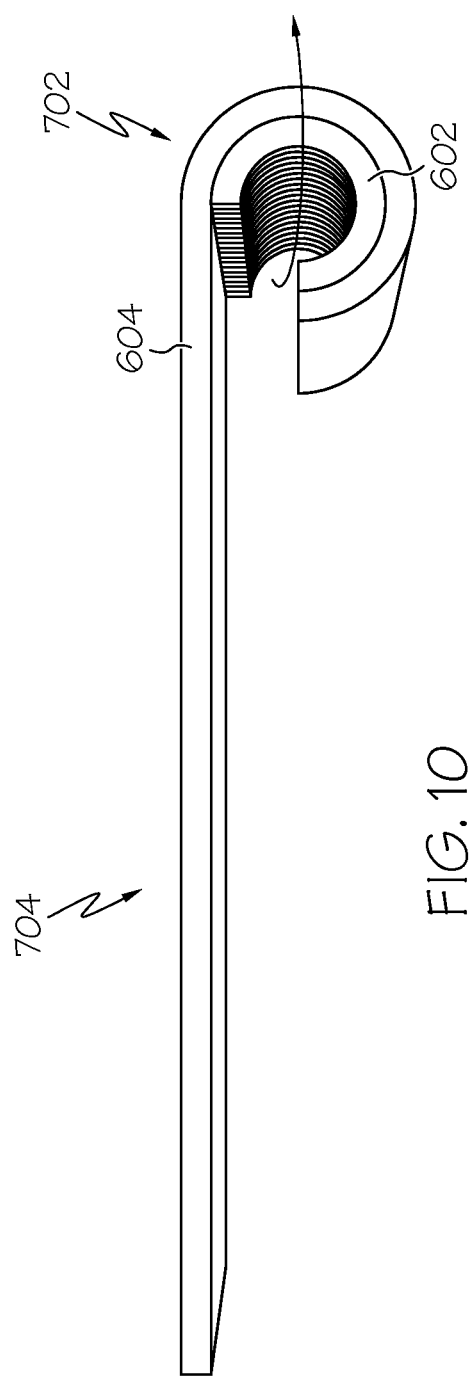

US 9,267,390 B2

BI-METALLIC ACTUATOR FOR SELECTIVELY CONTROLLING AIR FLOW BETWEEN PLENA IN A GAS TURBINE ENGINE

STATEMENT REGARDING FEDERALLY SPONSORED RESEARCH OR DEVELOPMENT

This invention was made with Government support under FA8650-09-D-2925-003 awarded by the U.S. Air Force. The Government has certain rights in this invention.

TECHNICAL FIELD

The present invention generally relates to air flow control systems in gas turbine engines, and more particularly relates to a system for selectively controlling air flow between plena in a gas turbine engine using a bi-metallic actuator.

BACKGROUND

In the field of gas turbine technology a great deal of effort has been, and continues to be, directed toward improving thermodynamic efficiency by operating gas turbine engines at ever increasing temperatures. These temperatures may exceed the temperatures that some materials within the turbine engine structure can normally tolerate. As such, cooling air may be provided to various turbine engine components using cooling air extracted from other parts of the engine. For example, in some gas turbine engines cooling air is extracted from a plenum at the discharge of the compressor, and is then directed to certain portions of the turbine.

For some gas turbine engines, the air that is extracted from the engine for turbine cooling may be at temperatures that require the air to be cooled before being directed to the turbine. In some turbofan gas turbine propulsion engines, a portion of the fan air flowing in the bypass duct may be continuously redirected and used to cool the extracted turbine cooling air. During some operational levels of the turbofan engine, fan air is not needed to adequately cool the extracted air, resulting in parasitic losses. Thus, there has been a long-felt need for a system that will controllably direct fan air to adequately cool air that is extracted for turbine cooling air, while substantially reducing, if not eliminating, parasitic engine losses. However, heretofore such systems have not been implemented due to the relatively complex, heavy, and costly actuation schemes associated therewith.

Hence, there is a need for a system that will controllably direct fan air (and other sources of air in a gas turbine engine) to various pneumatic loads that does not rely on relatively complex, heavy, and costly actuators or actuator controls. The present invention addresses at least this need.

BRIEF SUMMARY

In one embodiment, a system for selectively supplying air between separate plena of a gas turbine engine includes a gas turbine engine, a door, and a bi-metallic door actuator. The gas turbine engine comprises at least a first plenum and a second plenum, and has an opening between the first plenum and the second plenum. The is door mounted in the gas turbine engine and is movable between a closed position, in which air is prevented from flowing through the opening, and an open position, in which air may flow though the opening. The bi-metallic door actuator is coupled to the door and is configured to selectively move the door between the closed position and the open position.

In another embodiment, a system for supplying turbine cooling air flow includes a turbofan engine, a heat exchanger, a door, and a bi-metallic door actuator. The turbofan engine includes an engine case and a bypass flow passage. The engine case has an inner volume within which at least a gas turbine engine is mounted. The bypass flow passage is defined by an outer fan duct and an inner fan duct and is configured to direct fan air flow therethrough. The heat exchanger is disposed within the inner fan duct and includes a heat exchanger first flow passage and a heat exchanger second flow passage. The heat exchanger first flow passage is coupled to receive engine air from within the engine case, the heat exchanger second flow passage is coupled to selectively receive fan air from the bypass flow passage, and the heat exchanger configured to transfer heat between the engine air and the fan air. The door is movably mounted in the inner fan duct and is movable between a closed position, in which the cooling air will not flow into the heat exchanger second flow passage, and an open position, in which the cooling air may flow into the heat exchanger second flow passage. The bi-metallic door actuator is coupled to the door and configured to selectively move the door between the closed an open positions.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 9 and 10 depict alternative embodiments of the bi-metallic actuator depicted in FIGS. 6-8.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although the system for directing air flow that is described herein is done so in the context of a turbofan gas turbine propulsion engine, the system is not limited to this application. Indeed, it may be implemented in numerous applications to improve performance. Some non-limiting examples include auxiliary power units and environmental control systems.

Figure 1:
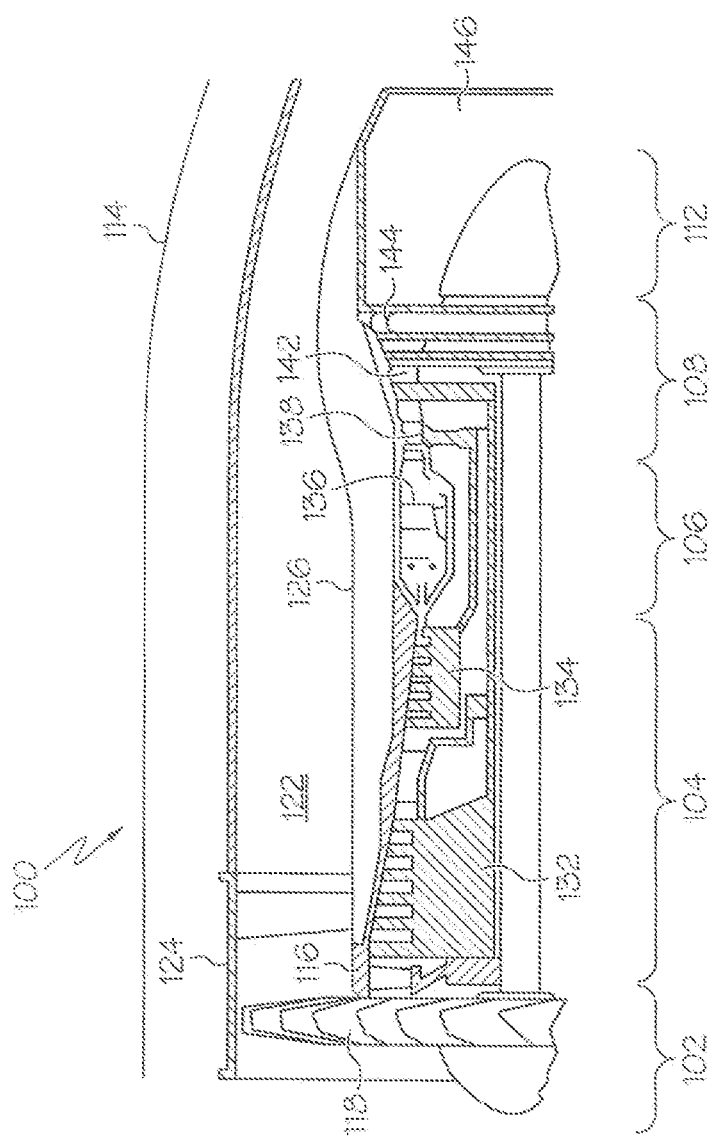
FIG. 1 depicts a simplified cross section view of a portion of a turbofan gas turbine propulsion engine.

Referring now to FIG. 1, a simplified cross section view of a turbofan gas turbine propulsion engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. As will be described further below, in some embodiments, a portion of the fan air in the fan air bypass duct 122 may be selectively directed into a plenum (not depicted in FIG. 1). The fraction of fan air that does not flow into the fan air bypass duct 122 is directed into the compressor section 104.

The compressor section 104 can include one or more compressors. The engine 100 depicted in FIG. 1 includes two compressors—an intermediate pressure compressor 132 and a high pressure compressor 134. No matter the number of compressors it includes, the air that is directed into the compressor section 104 is pressurized to a relatively high pressure. As will be described further below, in some alternative embodiments, a portion of the fan air that is directed into the compressor section 104 is selectively supplied from an input stage of the intermediate pressure compressor 132 to the above-mentioned heat exchanger.

The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines—a high pressure turbine 138, an intermediate pressure turbine 142, and a low pressure turbine 144—though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide addition forward thrust. As the turbines 138, 142, 144 rotate, each drives equipment in the gas turbine engine 100 via concentrically disposed shafts or spools as best seen in FIG. 1.

During operation, the temperatures within various portions of the engine 100 may reach relatively high temperatures. Thus, as depicted more clearly in FIG. 2, the engine 100 additionally includes a cooling air system 200 to provide cooling air to these various components within the engine 100. The cooling air system 200 extracts relatively hot air 202 from within the engine case 116, directs the relatively hot air 202 through a heat exchanger 204 to be selectively cooled, and then directs the selectively cooled air 206 back into the engine case 116 to provide cooling air to the various portions of the engine 100. As FIG. 2 further depicts, and as was mentioned above, a portion of the fan air in the fan air bypass duct 122 may be selectively directed into a plenum 212, via an inlet 214. When fan air is directed into the plenum 212, it flows through the heat exchanger 204 to cool the relatively hot air 202 that is extracted from the engine case 116, and is then directed back into the fan air bypass duct 122.

Figure 2:
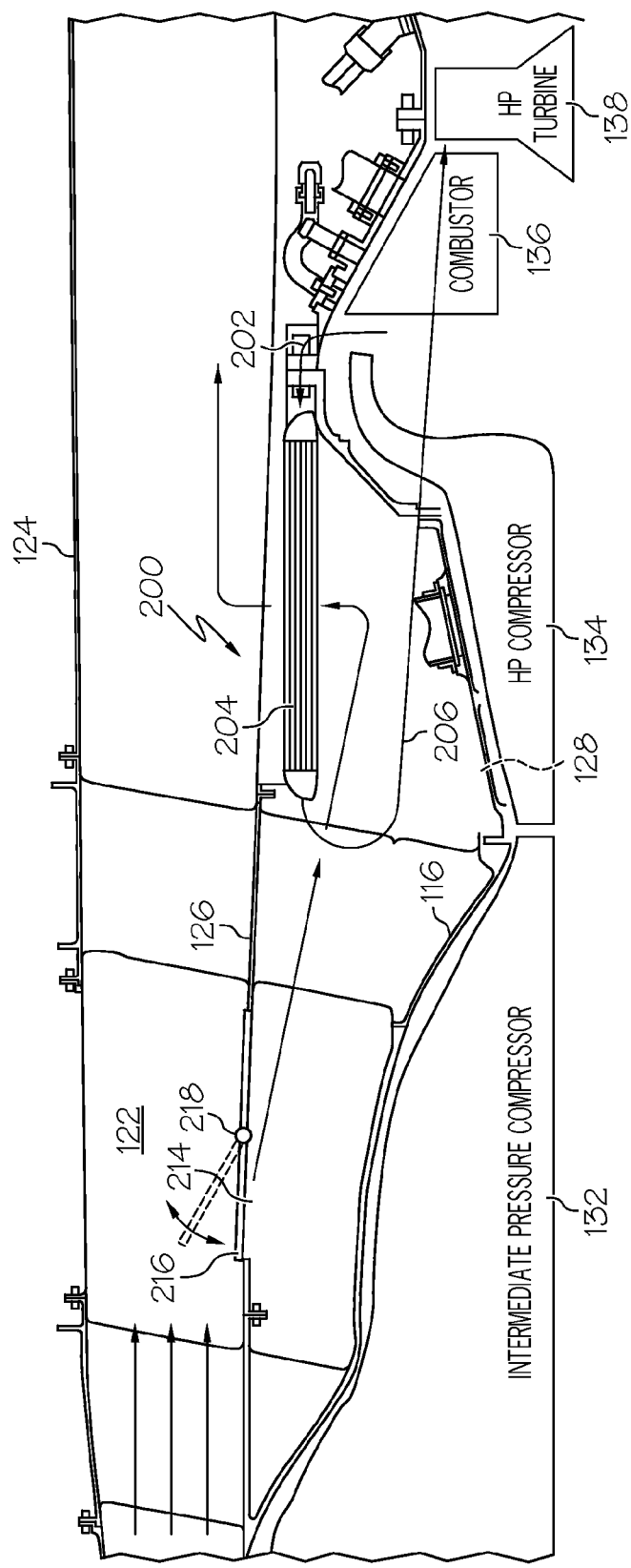
FIG. 2 depicts a close-up cross section view of a portion of the turbofan gas turbine engine of FIG. 1, illustrating an embodiment of a cooling air system.

In the embodiment depicted in FIG. 2, fan air is only selectively supplied to the heat exchanger 204 because of a door 216 that is movably mounted on the inner fan duct 126. The door 216 is movable between a closed position and one or more open positions. In the closed position, which is the position depicted using solid lines FIG. 2, the door 216 prevents fan air from flowing through the inlet 214 and into the plenum 212. In an open position, which is depicted using dashed lines in FIG. 2, fan air may flow through the inlet 214, into the plenum 212, and to the heat exchanger 204. The door 216 is preferably moved between the closed and open positions via an actuator 218. It will be appreciated that the actuator 218 may be implemented using any one of numerous types of passive or active actuator devices now known or developed in the future. In the depicted embodiment, however, the actuator 218 is a bi-metallic actuator, which may be configured to control the position of the door 216 either actively or passively. Various preferred implementations of the bi-metallic actuator 218 will be described in more detail further below.

Figure 3:
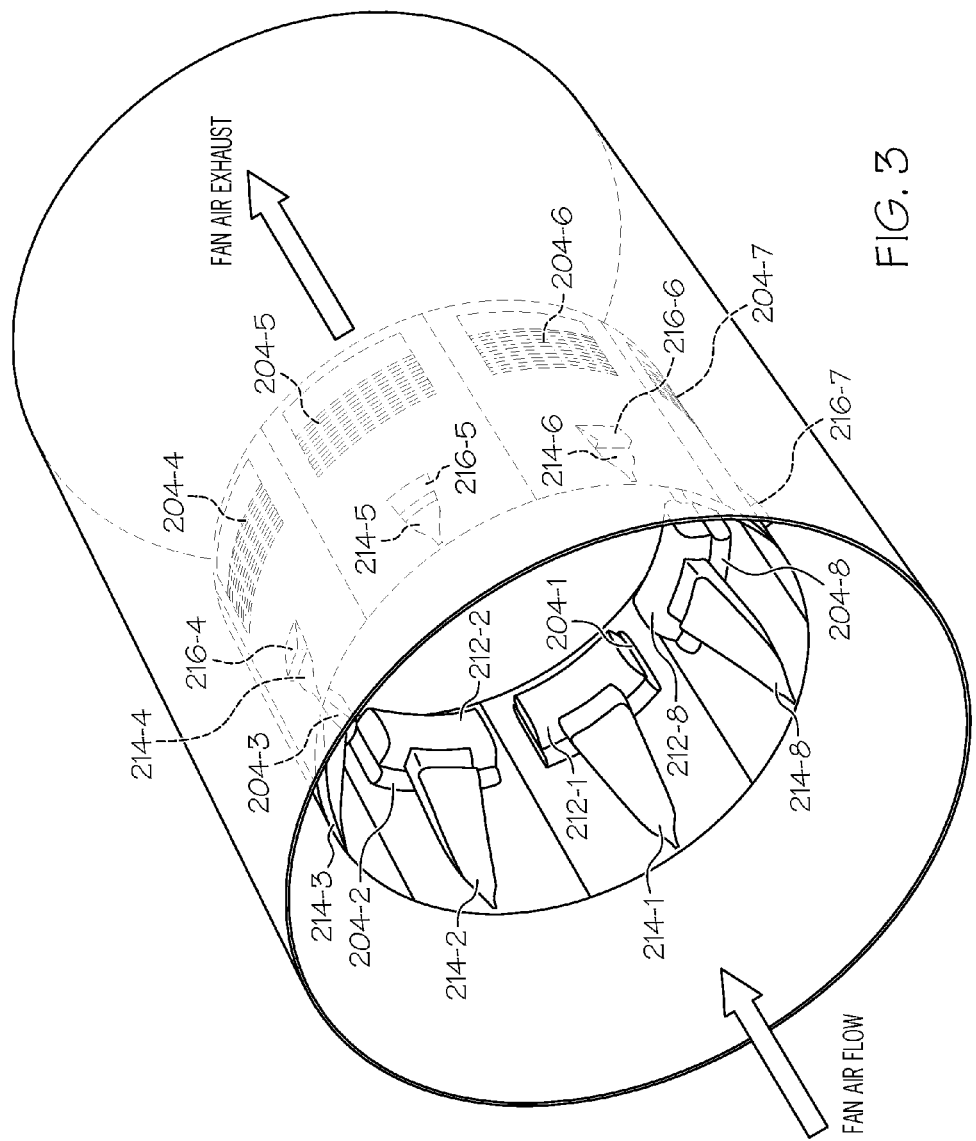
FIG. 3 depicts a simplified isometric view of inner and outer engine fan ducts, illustrating an arrangement of portions of the cooling air system depicted in FIG. 2.

It is noted that for clarity and ease of illustration, only a single heat exchanger 204, inlet 214, and door 216 are depicted in simplified form in FIG. 2. However, as depicted more clearly in FIG. 3, the gas turbine engine 100 preferably includes a plurality of heat exchangers 204 (204-1, 204-2, 204-3, . . . , 204-8), a plurality of plena 212 (212-1, 212-2, 212-3, . . . , 212-8) (not all of which are visible in FIG. 3), a plurality of inlets 214 (214-1, 214-2, 214-3, . . . , 214-8) (not all of which are visible in FIG. 3), a plurality of doors 216 (216-1, 216-2, 216-3, . . . , 216-8) (not all of which are visible in FIG. 3), and a plurality of bi-metallic actuators 218 (218-1, 218-2, 218-3, . . . , 218-8) (none of which are visible in FIG. 3). Each of the inlets 214 and each of the doors 216 are associated with a different one of the plena 212 and heat exchangers 204. Moreover, each door 216 is movably mounted on the inner fan duct 126, and is independently movable between the closed position and the open position. Although the depicted embodiment is implemented with eight heat exchangers 204, eight plena 212, eight inlets 214, eight doors 216, and eight bi-metallic actuators 218, it will be appreciated that this is merely exemplary of one embodiment, and that other numbers of heat exchangers 204, plena 212, inlets 214, doors 216, and bi-metallic actuators 218 may be used.

Figure 4:
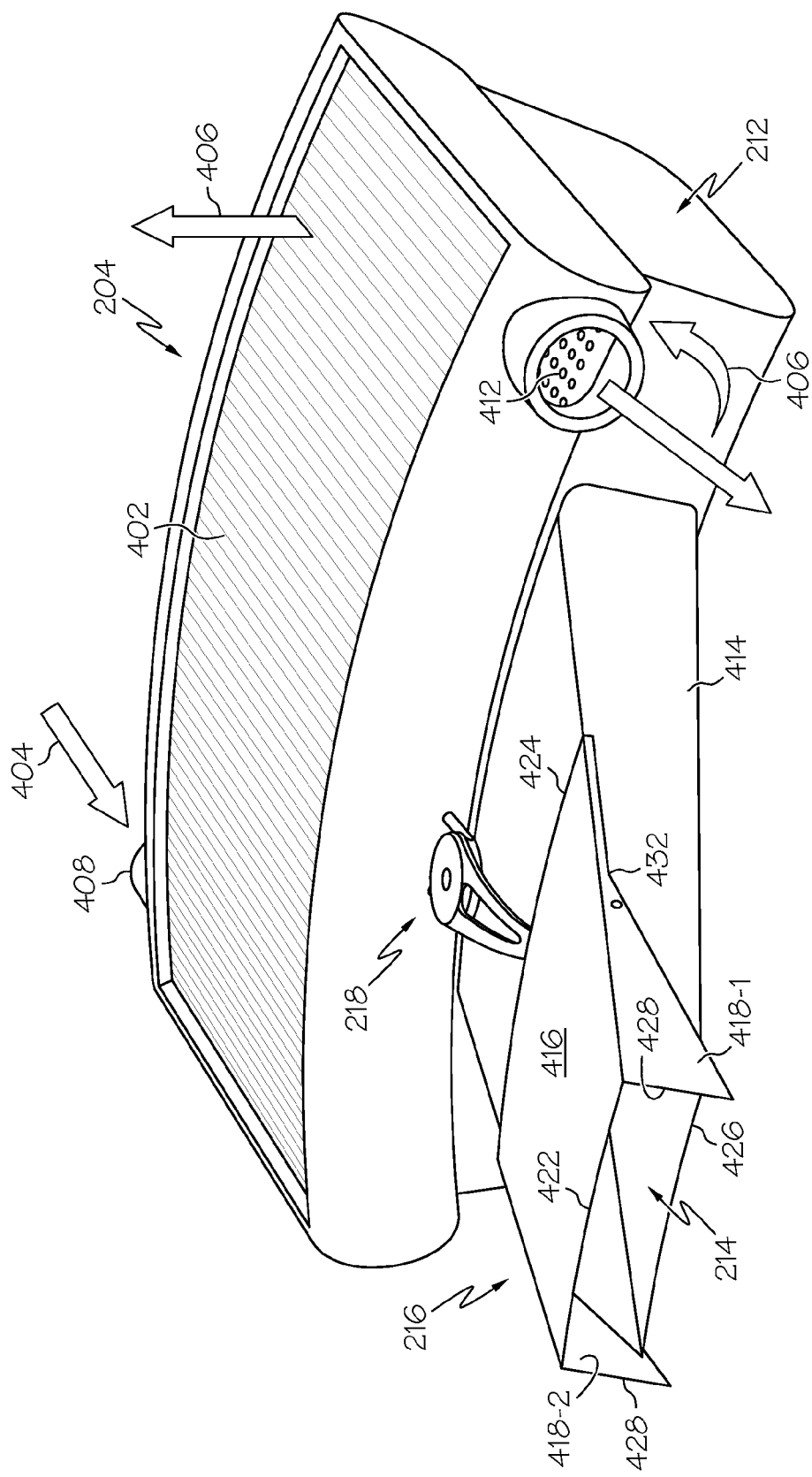
FIG. 4 and depict isometric views of different embodiments of a portion of the cooling air system depicted in FIG. 3.

Referring now to FIG. 4, a perspective view of one embodiment of a physical implementation of a heat exchanger 204, a plenum 212, a door 216, and a bi-metallic actuator 218 are depicted. The heat exchanger 204 is configured to transfer heat between the relatively hot air 202 and the fan air, and may be implemented using any one of numerous types of heat exchangers. The depicted heat exchanger 204 is preferably conformal, in that it is configured to conform to the curvature of the inner fan duct 126. It is also preferably configured to be coupled to two other heat exchangers to form an annular ring. This configuration minimizes the installation space, minimizes transmission pressure loss, and minimizes the differential pressure across the heat exchanger 204.

The heat exchanger 204 may also be implemented using any one of numerous types of heat exchanger configurations, but in the depicted embodiment it is implemented as a tubular bundle type that includes plurality of tubes 402, a heat exchanger first flow passage 404, and a heat exchanger second flow passage 406. The heat exchanger first flow passage 404 includes an inlet port 408 and an outlet port 412. The inlet port 408 is coupled to receive the relatively hot air 202 from within the engine case 116, and the heat exchanger second flow passage 406 is coupled to selectively receive fan air from the bypass flow passage 122. The relatively hot air 202 that flows into the heat exchanger inlet port 408, flows into and through the associated tubes 402, where it is selectively cooled, and the selectively cooled air 206 is discharged out the associated outlet port 412.

The heat exchanger second flow passage 406 is configured to direct the selectively supplied fan air across the associated tubes 402. The fan air is selectively supplied to the second flow passage 406 via the inlet 214, the plenum 212, and a duct 414 that fluidly communicates the inlet 214 to the plenum 212. As may be appreciated, when the door 216 is in the closed position, fan air will not flow into the inlet 214, through the duct 414, into the plenum 212, and through heat exchanger second flow passage 406, and thus will not cool the relatively hot air 202 flowing through the tubes 402. When, however, the door 216 is in an open position, fan air may flow into the inlet 214, through the duct 414, into the plenum 212, through heat exchanger second flow passage 406, over the tube bundle 402 in a single pass (or multiple passes in some embodiments), and back into the bypass duct 122, thus cooling the relatively hot air 202 flowing through the tubes. It will be appreciated that the heat exchanger 204 may be configured such that the fan air flow may be either cross flow, counter flow, or a combination of both.

The door 216 is rotationally coupled to the duct 414 to facilitate its movement between the closed position and the open position. Preferably, the door 216 is gravitationally balanced and aerodynamically balanced so that minimal force from the bi-metallic actuator 218 is needed to move it between the closed and open positions. The door 216 may be variously configured and implemented, but in the depicted embodiment it includes a top wall 416 and two side walls 418-1, 418-2. The top wall 416 has a leading edge 422, a trailing edge 424, and, at least in the depicted embodiment, is shaped to conform to the inner fan duct 126. It will be appreciated that in other embodiments the top wall 414 may be alternatively shaped. For example, its cross sectional shape may be slightly convex or concave (with respect to the inner fan duct 126). When the door 216 is in the closed position, the forward end 422 seals against an entrance lip 426 that at least partially defines the inlet 214.

The sidewalls 418-1, 418-2 each include a forward end 428 and an aft end 432, and extend downwardly from the top wall 416. The side walls 418-1, 418-2 are greater in height at the forward ends 428 than at the aft ends 432, and the door 216 is rotationally coupled to the duct 414 about midway between the forward ends 429 and the aft ends 432. In the depicted embodiment, the side walls 418-1, 418-2 are configured such that, when the door 216 is in the open position, the forward ends 428 are disposed perpendicular to (or at least substantially perpendicular to) the entrance lip 426. It will be appreciated that this configuration of the side walls forward ends 428 is merely exemplary of one embodiment, and that numerous other configurations could be implemented. For example, in other embodiments, when the door 216 is in an open position the forward ends 426 may be disposed non-perpendicular to the entrance lip 426. The door 216 depicted in FIG. 4 is additionally configured to be slightly wider than the entrance lip 312.

Figure 5:
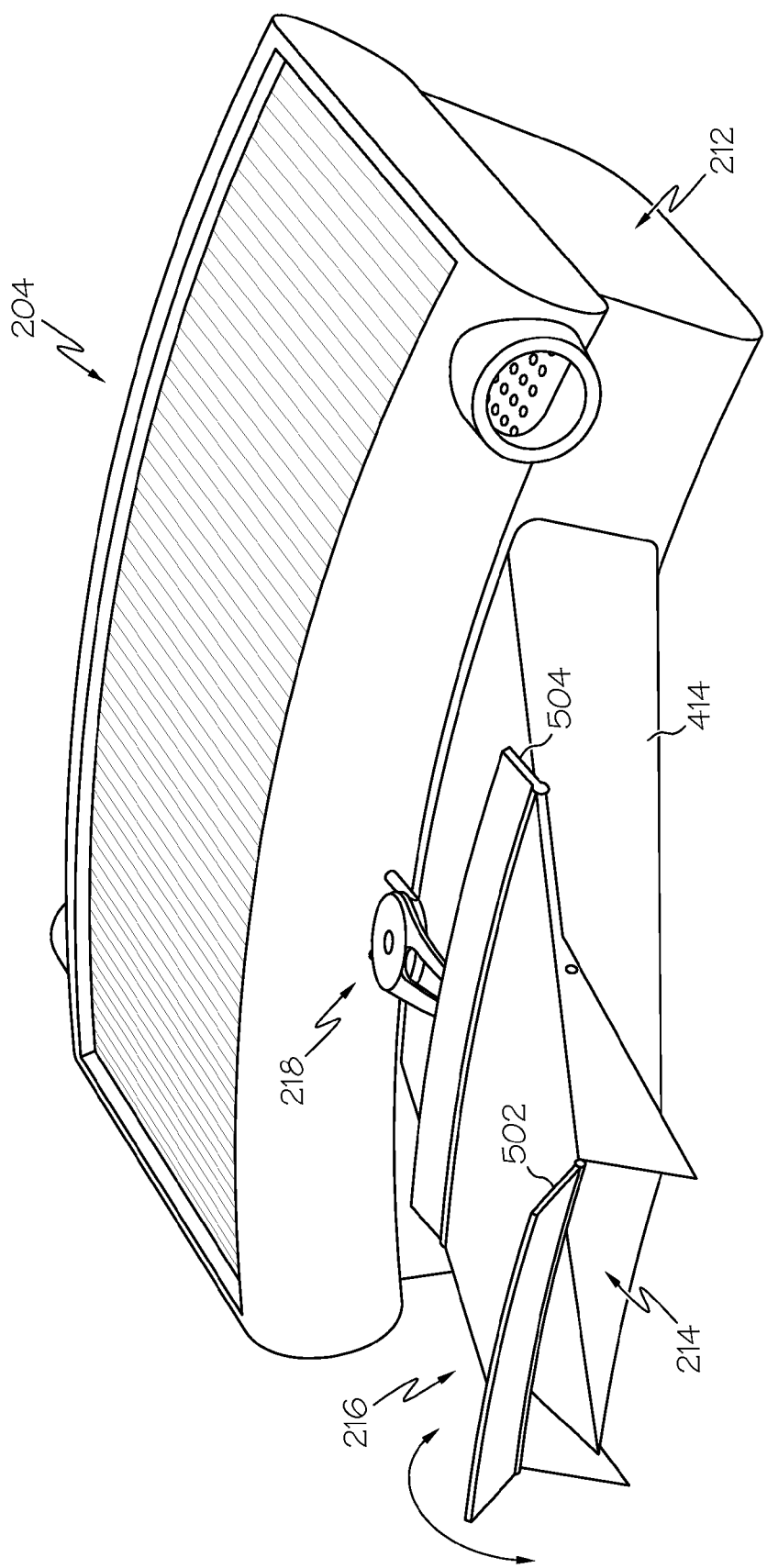

In addition to the above, and as depicted in FIG. 5, the door 216 may include one or more position-assisting pilots (or actuating force multipliers). More specifically, the door 216 may include a forward position-assisting pilot 502, an aft position-assisting pilot 504, or both. The position-assisting pilots 502 and 504, if included, are configured to provide an assisting opening force to the door 216 when it is being moved to an open position, and to provide an assisting closing force to the door 216 when it is being moved to the closed position. Though the configurations of the forward and aft position-assisting pilots 502, 504 may be varied, in the depicted embodiment each is configured as a flap that is rotationally mounted to the door 216, and mechanically linked together. More specifically, the forward position-assisting pilot 502 is rotationally mounted to the leading edge 422 of the top wall 416 and is mechanically linked to the aft position-assisting pilot 504, which is rotationally mounted to the trailing edge 424 of the top wall 416. The forward and aft position-assisting pilots 502, 504 reduce the force that the bi-metallic actuator 218 needs to supply in order to move the door 216 to a desired position.

Figure 6:
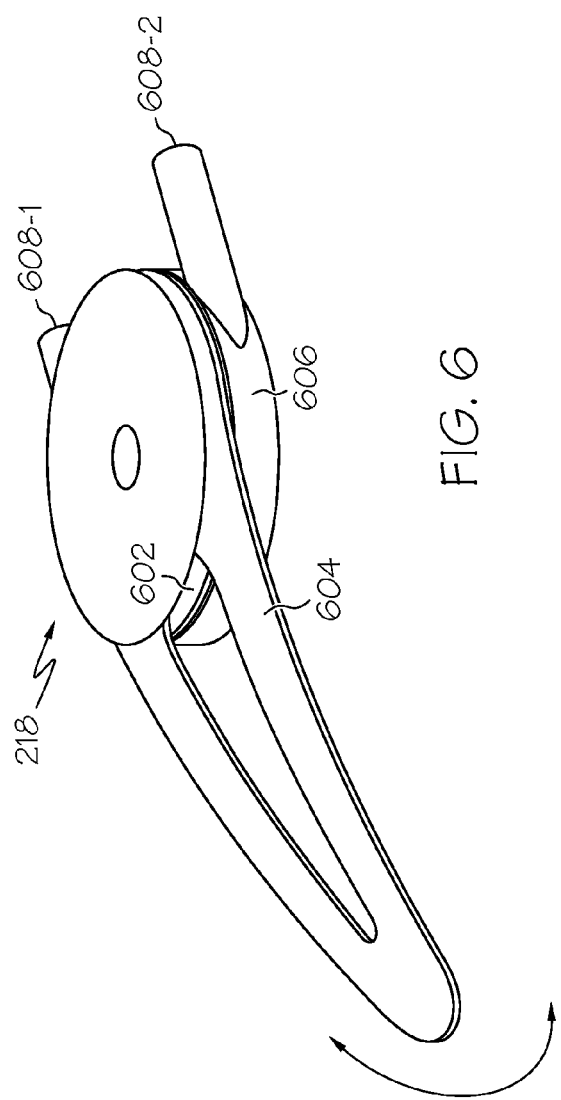
FIGS. 6-8 depict various views of an embodiment of a bi-metallic actuator that may be used to implement the cooling air systems depicted in FIGS. 2-5
Figure 7:
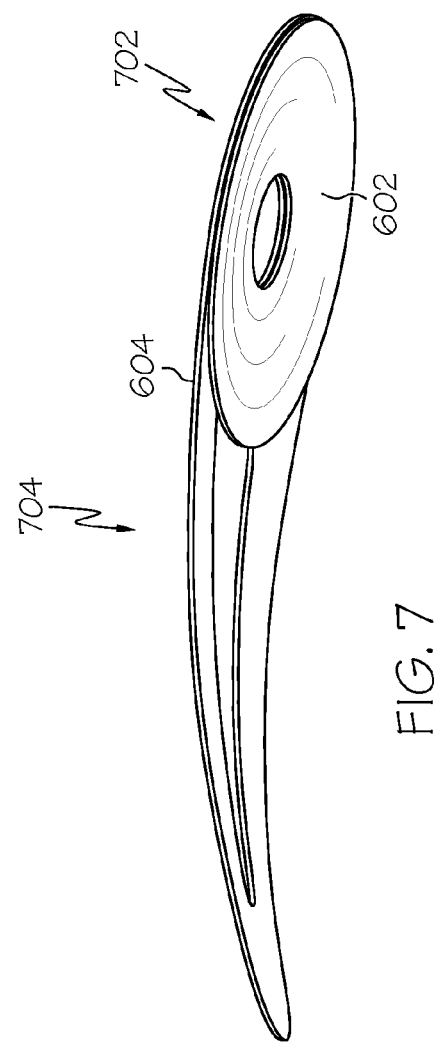
Figure 8:
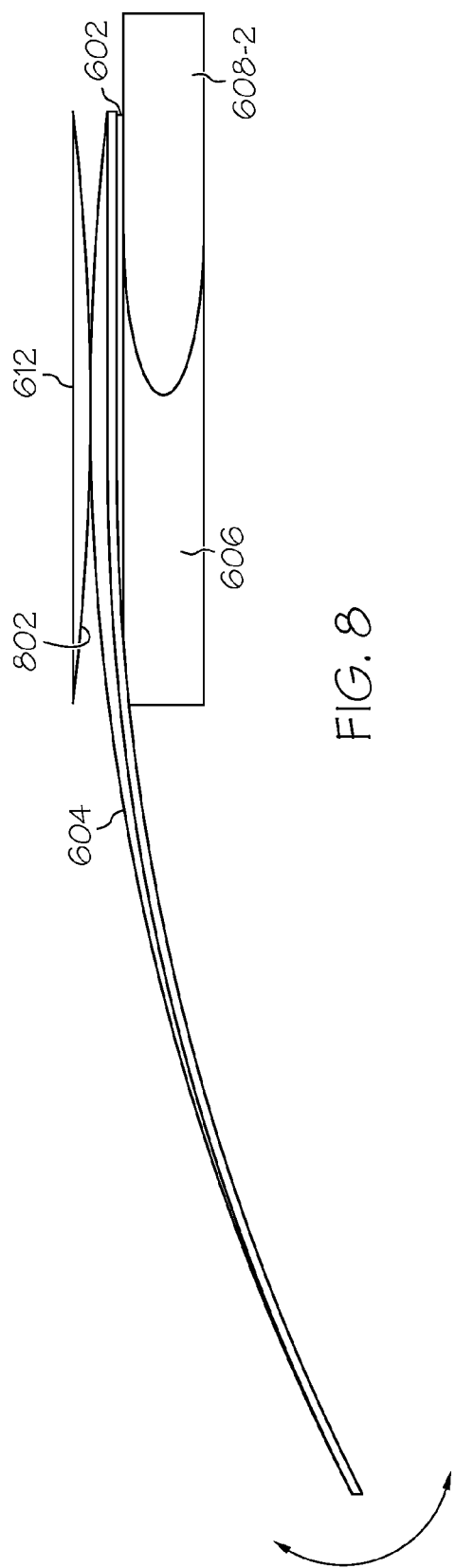

The bi-metallic actuator 218, as previously noted, is configured to move the door 216 between the closed and one or more open positions. More specifically, the bi-metallic actuator 218 is preferably configured to move the door 216 to an open position when the temperature of the relatively hot air 202 is at or above a first predetermined temperature, and to the closed position when the temperature of the relatively hot air 202 is at or below a second predetermined temperature. The first and second predetermined temperatures may be any one of numerous temperatures. It will be appreciated that the bi-metallic actuator 218 may be configured to move the door 216 between the closed position and a single open position, or it may be configured to modulate the positions of the door 216. Moreover, the bi-metallic actuator 218 may be configured as a passive actuator or an active actuator. The bi-metallic actuator 218 depicted in FIGS. 4 and 5 is configured as a passive actuator that selectively moves the door 216 between the closed position and a single open position. Various views of this particular embodiment are depicted in FIGS. 6-8, and with reference thereto will now be described in more detail.

The depicted bi-metallic actuator 218 comprises a first metallic member 602, a second metallic member 604, and a sensing/feedback member 606. As shown most clearly in FIG. 7, the first metallic member 602 is implemented as a curved, semispherical disc, and is bonded (or otherwise coupled) to the second metallic member 604. The second metallic member 604 includes a first section 702 that is also shaped as a curved, semispherical disc, and a second section 704 that extends away from the first section 704 and, as will be described further below, is used to move the door 216 between the open and closed positions. The first and second metallic members 602, 604 are comprised of different metallic materials that exhibit different coefficients of thermal expansion ($\alpha$). Although the specific metallic materials may vary, in one particular embodiment, the first metallic member 602 comprises Inconel 718 and the second metallic member 604 comprises Incoloy 909, which has a lower coefficient of thermal expansion ($\alpha$) than Inconel 718. In addition to variations in the specific materials, the relative values of the coefficients of thermal expansion of the first and second metallic members 602, 604 may also vary. For example, in some embodiments the coefficient of thermal expansion of the first metallic member 602 could be less than that of the second metallic member 604. The specific materials and relative coefficients of thermal expansion may be selected based, for example, on the direction of actuation and/or the controlling temperature.

The sensing/feedback member 606 includes two fluid ports 608 (608-1, 608-2). In the embodiment depicted in FIG. 4, each fluid port 608 is coupled to a portion of the heat exchanger first flow passage 404, upstream of the outlet port 412, to allow a portion of the selectively cooled air 206 to flow therethrough. Thus, as the temperature of the selectively cooled air 206 varies, the first and second metallic members 602, 604 will expand and contract differently.

The second metallic member 604, and more specifically the first section 702 of the second metallic member 604, is disposed between the first metallic member 602 and a top member 612. As shown more clearly in FIG. 8, the top member 612 has an inner surface 802 that is also shaped as a curved, semispherical disc. Thus, when the first and second metallic members 602, 604 expand and contract differently, the second section 704 of the second metallic member 604 exhibits a snap-action between a first position and a second position. In the first position, which is the position depicted in FIG. 6, the second section 704 moves the door 216 to the open position. In the second position, the second section 704 moves the door 216 to the closed position. As may be readily appreciated, the first and second metallic members 602, 604 are preferably configured such that the second section 704 moves to the first position when the temperature of the relatively hot air 202 is at or above the previously mentioned first predetermined temperature, and moves to the second position when the temperature of the relatively hot air 202 is at or below the previously mentioned second predetermined temperature.

The bi-metallic actuator 218 described above and depicted in FIGS. 4 and 5 is disposed such that the sensing/feedback member 606 receives a portion of the selectively cooled air 206. Thus, the bi-metallic actuator 218 implements closed-loop temperature control. In other embodiments, the bi-metallic actuator 218 may be disposed to receive air from various locations between the inlet port 408 and outlet port 412. For example, the bi-metallic actuator 218 may be disposed such that a portion of the relatively hot air 202 is directed into the sensing/feedback member 606, and then is discharged from the sensing/feedback member 606 into the selectively cooled air 206 (upstream of outlet port 412), to thereby implement open-loop temperature control. In still other embodiments, the bi-metallic actuator 218 may be disposed such that a portion of the air flowing in one or more of the tubes 402 is directed into the sensing/feedback member 606, and then is discharged from the sensing/feedback member 606 into the selectively cooled air 206 (upstream of outlet port 412), to thereby implement hybrid temperature control. The location at which a portion of the air flowing in the one or more tubes 402 is redirected into the sensing/feedback member 606 may vary.

Figure 9:
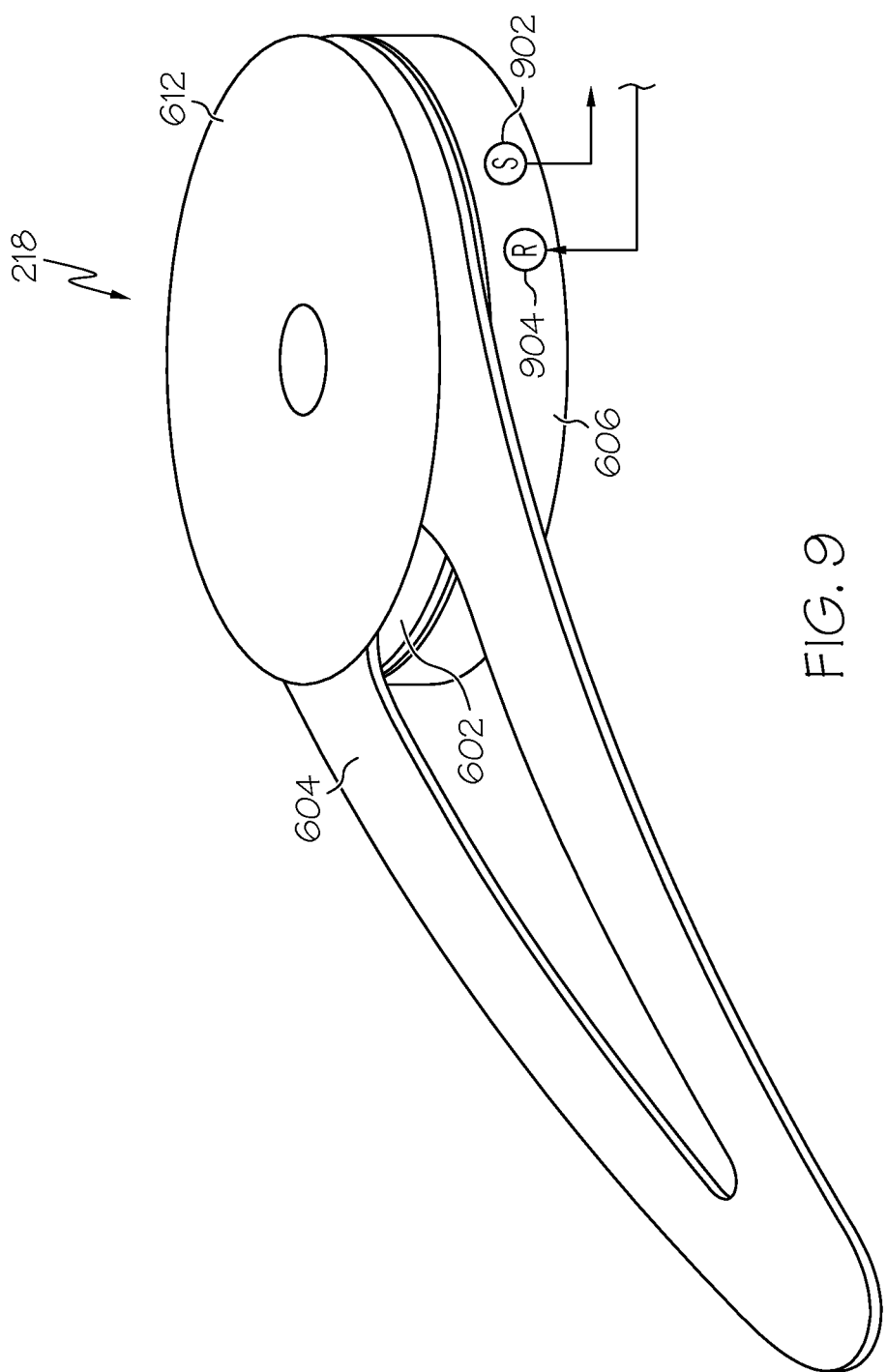

The bi-metallic actuator 218 described above and depicted in FIGS. 4-8 is implemented as a passive actuator device. As was noted above, the bi-metallic actuator 218 may also be implemented as an active actuator device. In such an embodiment, as depicted in FIG. 9, the sensing/feedback member 606 may have one or more temperature sensors 902 and/or one or more electrically resistive elements 904 embedded therein. The sensors 902 and resistive elements 904 may be electrically coupled to a non-illustrated control device that, based on the temperature sensed by the temperature sensors 902, selectively supplies current to the resistive elements 904 to thereby control the temperature of the first and second metallic members 602, 604. The sensors 902 may be disposed in the sensing/feedback member 606, as depicted in FIG. 9, or the sensors 902 may be disposed within one of the two fluid ports 608, or at various other locations within the heat exchanger 204

It will additionally be appreciated that the bi-metallic actuator 218 may be configured to selectively move the door 216 between the closed position and a plurality of open positions. That is, it may be configured to selectively modulate the position of the door between the closed position and a full-open position. One embodiment of this particular implementation is depicted in FIG. 10. With this implementation, the bi-metallic actuator 218 also includes first and second metallic members 602, 604 that are comprised of different metallic materials that exhibit different coefficients of thermal expansion (a). However, the metallic members 602, 604 are implemented as partially rounded strips. As with the first-described embodiment, the second metallic member 604 depicted in FIG. 10 also includes a second section 704. The second section 704 is configured to be either coupled to or to engage the door 216. As with the other embodiments described above, the specific materials and the relative values of the coefficients of thermal expansion of the first and second metallic members 602, 604 may vary. In this embodiment, air from one or more sections of the heat exchanger 204 preferably flows through a non-depicted tube that extends through the rounded portions of the actuator 218.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for selectively supplying air between separate plena of a gas turbine engine, comprising:

a gas turbine engine comprising at least a first plenum and a second plenum, and having an opening between the first plenum and the second plenum;

a door mounted in the gas turbine engine and movable between a closed position, in which air is prevented from flowing through the opening, and an open position, in which air may flow though the opening; and a bi-metallic door actuator coupled to the door and configured to selectively move the door between the closed position and the open position, the bi-metallic door actuator comprising:

a first metallic member comprised of a first metallic material, the first metallic material having a first coefficient of thermal expansion, and a second metallic member comprised of a second metallic material, the second metallic material having a second coefficient of thermal expansion that is unequal to the first coefficient of thermal expansion, the second metallic member including a first section and a second section, the first section coupled to the first metallic member, the second section extending away from the first section and coupled to the door.

2. The system of claim 1, wherein the bi-metallic door actuator is configured to as a passive actuator.

3. The system of claim 1, wherein the bi-metallic door actuator is configured as an active actuator.

4. The system of claim 1, wherein:
the door includes a leading edge and a trailing edge; and
the system further comprises a position-assisting pilot pivotally mounted on the leading edge, whereby the position-assisting pilot may pivot about the leading edge independent of the door.

5. The system of claim 1, wherein:
the door includes a leading edge and a trailing edge; and
the system further comprises a position-assisting pilot pivotally mounted on the trailing edge, whereby the position-assisting pilot may pivot about the trailing edge independent of the door.

6. The system of claim 1, wherein the bi-metallic actuator is configured to selectively modulate the position of the door between the closed position and a full-open position.

7. The system of claim 1, wherein the bi-metallic actuator is configured to selectively move the door only between the closed position and a single open position.

8. A system for supplying turbine cooling air flow, comprising:
a turbofan engine including an engine case and a bypass flow passage, the engine case having an inner volume within which at least a gas turbine engine is mounted, the bypass flow passage defined by an outer fan duct and an inner fan duct and configured to direct fan air flow therethrough;

a heat exchanger disposed within the inner fan duct and including a heat exchanger first flow passage and a heat exchanger second flow passage, the heat exchanger first flow passage coupled to receive engine air from within the engine case, the heat exchanger second flow passage coupled to selectively receive fan air from the bypass flow passage, the heat exchanger configured to transfer heat between the engine air and the fan air;

a door movably mounted in the inner fan duct and movable between a closed position, in which the cooling air will not flow into the heat exchanger second flow passage, and an open position, in which the cooling air may flow into the heat exchanger second flow passage; and a bi-metallic door actuator coupled to the door and configured to selectively move the door between the closed an open positions, the bi-metallic door actuator comprising:

a first metallic member comprised of a first metallic material having a first coefficient of thermal expansion, and a second metallic member comprised of a second metallic material having a second coefficient of thermal expansion that is unequal to the first coefficient of thermal expansion, the second metallic member including a first section and a second section, the first section coupled to the first metallic member, the second section extending away from the first section and coupled to the door.

9. The system of claim 8, wherein the bi-metallic door actuator is configured to as a passive actuator.

10. The system of claim 8, wherein the bi-metallic door actuator is configured as an active actuator.

11. The system of claim 8, wherein:
the door includes a leading edge and a trailing edge; and
the system further comprises a position-assisting pilot pivotally mounted on the leading edge, whereby the position-assisting pilot may pivot about the leading edge independent of the door.

12. The system of claim 8, wherein:
the door includes a leading edge and a trailing edge; and
the system further comprises a position-assisting pilot pivotally mounted on the trailing edge, whereby the position-assisting pilot may pivot about the trailing edge independent of the door.

13. The system of claim 8, wherein the bi-metallic actuator is configured to selectively modulate the position of the door between the closed position and a full-open position.

14. The system of claim 8, wherein the bi-metallic actuator is configured to selectively move the door only between the closed position and a single open position.

* * * * *